(12) United States Patent
Hara et al.

(10) Patent No.: US 6,679,480 B1
(45) Date of Patent: Jan. 20, 2004

(54) WIRE FASTENING DEVICE AND WIRE EXTENDING STRUCTURE USING WIRE FASTENING DEVICES

(75) Inventors: Choei Hara, Tokyo (JP); Takayuki Aoshika, Tokyo (JP); Kenichi Masabayashi, Tokyo (JP)

(73) Assignees: Joint Center Co., Ltd., Tokyo (JP); Ultima Co., Ltd., Tokyo (JP); Shoei Kogyo Co., Ltd., Tokyo (JP)

( * ) Notice: Subject to any disclaimer, the term of this patent is extended or adjusted under 35 U.S.C. 154(b) by 74 days.

(21) Appl. No.: 09/644,215

(22) Filed: Aug. 23, 2000

(30) Foreign Application Priority Data

Aug. 24, 1999  (JP) ............................................. 11-236788

(51) Int. Cl.[7] ......................... F16G 11/10; F16G 11/12; A47F 5/08; E04F 11/18
(52) U.S. Cl. ..................... 256/47; 256/65.02; 256/37; 256/39; 256/65.15; 403/21; 267/70
(58) Field of Search ............................. 267/70; 403/21; 256/56, 65.02, 37, 39, 32, 65.15

(56) References Cited

U.S. PATENT DOCUMENTS

| 483,762 | A | * | 10/1892 | Crippen ........................ 267/70 |
| 505,032 | A | * | 9/1893 | Curry ........................... 267/70 X |
| 534,645 | A | * | 2/1895 | Harmon ......................... 267/71 X |
| 629,290 | A | * | 7/1899 | Goodbaudy ..................... 267/70 X |
| 849,265 | A | * | 4/1907 | Parkhurst ....................... 267/70 X |
| 919,871 | A | * | 4/1909 | Ingram et al. ................. 267/70 X |
| 1,842,638 | A | * | 1/1932 | Wigle .......................... 267/70 X |
| 2,128,030 | A | * | 8/1938 | Koleno .......................... 267/72 |
| 2,164,709 | A | * | 7/1939 | Hall et al. .................... 267/70 |
| 2,509,274 | A | * | 5/1950 | Nugey ........................... 267/70 |
| 2,997,325 | A | * | 8/1961 | Peterson ....................... 293/133 |
| 3,164,354 | A | * | 1/1965 | Murdock ....................... 256/59 X |
| 3,717,326 | A | * | 2/1973 | Leach et al. ................. 256/13.1 |

FOREIGN PATENT DOCUMENTS

| JP | 57-10742 | | 2/1957 | ............ A47F/5/00 |
| JP | 8-93167 | | 4/1996 | ............ E04F/11/18 |
| JP | 10-38034 | A * | 2/1998 | |
| JP | 11-344081 | A * | 12/1999 | |
| NL | 291261 | A * | 6/1965 | |

OTHER PUBLICATIONS

Patent Abstracts of Japanese Patent 10038034, published Feb. 13, 1998.
Patent Abstracts of Japanese Patent 11344081, published Dec. 14, 1999.
Patent Abstracts of Japanese Patent 08093167, published Apr. 9, 1996.

* cited by examiner

*Primary Examiner*—Gregory J. Binda
*Assistant Examiner*—Ernesto Garcia
(74) *Attorney, Agent, or Firm*—Staas & Halsey, LLP (57) ABSTRACT

A wire fastening device and a wire extending structure capable of extending a wire with an appropriate tension between support. The wire fastening device includes a case, a cap bolt and a pulling cylinder. The case has a wire engaging portion at one end thereof and a female thread formed on an inner circumference thereof. The cap bolt is inserted into the pulling cylinder with the head abutted with the pulling cylinder and has a male thread formed on an outer circumference thereof. The pulling cylinder is held on the cap bolt rotatably and the case, with one end of the wire engaged therewith, is screwed on the pulling cylinder.

14 Claims, 11 Drawing Sheets

WIRE FASTENING DEVICE AND WIRE EXTENDING STRUCTURE USING WIRE FASTENING DEVICES

BACKGROUND OF THE INVENTION

1. Field of the Invention

The present invention relates to a wire fastening device for extending a wire between support bodies and a wire extending structure for constituting a handrail, a fence, etc. using the wire fastening devices.

2. Description of the Related Art

A wire extending structure is used for constituting a fence for exhibiting entrance through a railing bar and indicating a boundary of a no-entry zone, and a wire guard for preventing people and vehicles form falling. The wire extending structure is installed on a flat or inclined floor or ground, and also vertically between a ceiling and a floor. Further, wires for the wire guard along a road and wires for architecture bear a load exerted on the structure. In any of the cases, one end of the wire is fixed to one support body and the other end of the wire is fixed to another support body. The wire extending structure has been widely adopted because of fine appearance of line design and good perspective view of background.

There have been proposed wire fixing devices for fixing ends of the wire on the support bodies in Japanese Utility-Model Publication No. 57-107472 and Japanese Patent Publication No. 8-93167. The wire fixing device disclosed in these publications comprises a fixing member for fixing on a support body, a connection member for connecting one end of the wire and a cap or casing. The fixing member has a proximal portion fixed to the support body by a screw or welding and a male thread formed at the other end. The connection member fixed to the end of the wire is attached to the fixing member by screwing on the male thread. The one end of the wire is fixed to the connection member by pinching it by a chuck or a stopper or by caulking. The cap is provided for covering the coming out portion of the wire from the connection member for improving appearance and often formed integrally with the connection member.

In these fixing devices, since the wire is fixed to the support body by rotating the connection member with respect to the fixing member, if the connection member is rotated by mischief after installation the wire easily looses tension. Further, since a pulling stroke of the wire by the threaded engagement between the fixing member and the connection member is small, a sufficient tension is not provided on the to wire when a length of the wire is too long for the pulling stroke, and contrary, where the wire is too short to fully screw the connection member into the fixing member so that an opening is formed between the connection member and the fixing member.

Furthermore, the connection of the end of the wire with the connection member by a chuck makes the connection member thick and deteriorates the appearance of the wire structure.

The connection members with one end of the wire caulked have to be rotated simultaneously making it hardly possible to install by one person.

SUMMARY OF THE INVENTION

An object of the present invention is to provide a wire fastening device and a wire extending structure to extend a wire between support bodies with an appropriate tension to enhance the appearance without deteriorating strength and to prevent mischief after installation.

The case has a cylindrical shape with one end closed and has a through hole at the one end for inserting one end of a wire and an engaging portion for engaging a stopper fixed to the one end of the wire. The case has a female thread on an inner circumference thereof.

The case has a cylindrical shape with one end closed and has a through hole at the one end for inserting one end of a wire and engaging portion for engaging a stopper fixed to the one end of the wire. The case has a female thread on an inner circumference thereof.

The pulling cylinder has a male thread on an outer circumference thereof to be engaged with the female thread of the case. The pulling cylinder has an inner diameter such that the pulling cylinder is fitted on a shank of the cap bolt and to abut a head of the cap bolt. The threads formed on the cap and the pulling cylinder may be of left-handed threads so as not to loosen the right-handed screwed fixing of the cap bolt when the pulling cylinder is rotated with respect to the case to pull the case with the wire.

A wire fastening device is set up by engaging the stopper fixed to one end of the wire with the case, and the cap bolt with the pulling cylinder fitted thereon is fixed to the terminal pole. The cap bolt is fixed to the terminal pole in various manners, such as welding, threaded engagement with a cap nut, or threaded engagement with an end bolt using a threaded spacer cylinder therebetween. The case with one end of the wire is fitted into the cap bolt to be engaged with the pulling cylinder by rotating the pulling cylinder.

Another wire fastening device is set up by inserting the other end of the wire into a through hole of the cap and fixing another stopper on the other end of the wire. The stopper may be fixed on the other end of the wire by caulking or set screws screwed in holes formed on the stopper.

The cap with the other end of the wire engaged therewith is fitted in the cap bolt fixed to another pole to be engaged with the pulling cylinder by rotating the pulling cylinder.

In the above manner, the wire is extended between one pole and another pole. Then, the pulling cylinder is rotated with respect to the case to pull the case towards the support body by the threaded engagement between the pulling cylinder and the case since the pulling cylinder is rotatably supported by the head of the cap bolt retaining an axial position thereof Thus the wire is strained with an appropriate tension by the axial movement of the case.

By setting the length of the pulling cylinder slightly shorter than the pulling distance of the wire, the pulling cylinder is fully inserted into and covered by the case when the wire is strained with an appropriate tension. If the case is rotated, the pulling cylinder rotates with the case but does not cause relative rotation between the case and the pulling cylinder, thereby preventing wire slack.

The pulling cylinder is rotated relatively to the case to be fully inserted into the case by a dedicated tool engaged with notches formed on the pulling cylinder, and thus the dedicated tool is necessary to loosen the threaded engagement between the case and the pulling cylinder to prevent mischiefs of the device. It is preferable to close an opening between the case and the pulling cylinder by sealing material after straining the wire. The case and the pulling cylinder may be fixed with each other not to permit the relative rotation therebetween after fastening the wire.

A spacer may be used for securing a space for a rotating operation of the pulling cylinder by the dedicated tool. The spacer cylinder has a female thread on an inner circumference thereof to be engaged with the male thread formed on the shank of the cap bolt.

Notches for engagement with a tool are provided in the pulling cylinder for easy rotation thereof. The notches may be a hexagonal nut formed integrally on the outer circumference and preferably are cutaways formed at a rear end closer to the support body to extend in the axial direction. With such cutaways, the pulling cylinder can be rotated by a dedicated tool engaged with the cutaways inserted from an opening of the case to be completely covered by the case so that the appearance of the fastening device is enhanced. The pulling cylinder can be further rotated by the dedicated tool after the pulling cylinder is completely covered by the case.

By rotating the pulling cylinder, the case is moved towards the support body. A spacer may be used for securing a space for operating the tool between the rear end of the case and the support body. By setting an outer diameter of the space ring smaller than an inner diameter of the case, the rear end of the case may cover the pulling cylinder and also the spacer to enhance the appearance of the connection between the fastening device and the support body. A space is formed between the fastening device and the support body when the wire extending structure is installed and this space may be preferable in design as a handrail or a fence.

A periphery of a front end of the pulling cylinder is abutted with the head of the cap bolt and a periphery of one end of the spacer is abutted with a rear end of the pulling cylinder to place the pulling cylinder in a stationary axial position on the shank of the cap bolt. A washer may be intervened between the pulling cylinder and the head of the cap bolt for smooth rotation of the pulling cylinder.

The connection between the pulling cylinder and the case is accomplished by threaded engagement of the male thread on the entire outer circumference of the pulling cylinder and the female thread on the inner circumference of the case to have strength in the pulling direction. The connection between the case and the wire is accomplished by engagement between the stopper fixed to one end of the wire and an engaging portion of the case to have sufficient strength and reduce diameters of the cap bolt and the case.

The wire extending structure is constituted by a wire with both ends fixed to stoppers and the wire fastening devices engaged with the both ends of the wire.

The cap bolt of one wire fastening device is fixed to one support body and the cap engaged with one end of the wire is fitted to the cap bolt and screwed on the pulling cylinder to connect the one end of the wire with the one support body. Likewise, the cap bolt of another wire fastening device is fixed to another support body and the cap engaged with the other end of the wire is fitted to the cap bolt and screwed on the pulling cylinder to connect the other end of the wire with the another support body.

A plurality of units of the above wire extending structure between one support body and the other support body can be provided in series to extend the shielding effect or the wire extending structure can be extended by using the other support body of one wire extending structure as one support body of the adjacent wire extending structure.

When the wire extending structure is provided in series, the adjacent wire fastening devices with a connecting pole between may be connected by one grub screw arranged to penetrate the connecting pole in the direction of the wires. With this arrangement, the adjacent wire fastening devices are aligned in a line and an attaching work of the adjacent wire fastening devices is reduced.

The spacer may have a boss formed integrally therewith and can be used for constituting the wire extending structure on an inclined floor. The boss is rotatably supported by a shaft inserted into the supporting pole in a direction perpendicular to the wire axis. With this arrangement, the spacer can swing about the shaft in accordance with an angle formed between the wire and the support pole to align the wire axes on both sides of the connecting pole.

The support body includes a ceiling, a floor, a wall, a polygonal or annular frame as well as a pole. The wire may be not only a so-called wire by twisting metal lines such as stainless steel lines but also a thread, a string, a cord, a rope, a line made of fibers, resin, metal, etc.

An intermediate support body may be used for merely supporting the wire by a through hole between the one support body and the other support body. The through hole for inserting the wire preferably has substantially the same diameter as that of the wire for a handrail or a fence so as to prevent noises caused by a strong wind and enhance the design.

In order to retain the tension of the wire and absorb a difference between a length the wire and a distance between the one support body and the other support body, a resilient member such as a coil spring may be used to intervene between the case and the stopper fixed to one end of the wire.

A scale of the wire extending structure, and thus diameter of the wire and dimension of the support body are not restricted. In general, the support body and the wire fastening device has a greater dimension when the wire has a greater diameter.

The wire fastening device of the present invention may be utilized for suspending an article vertically.

DETAILED DESCRIPTION OF THE PREFERRED EMBODIMENTS

Figure 1:
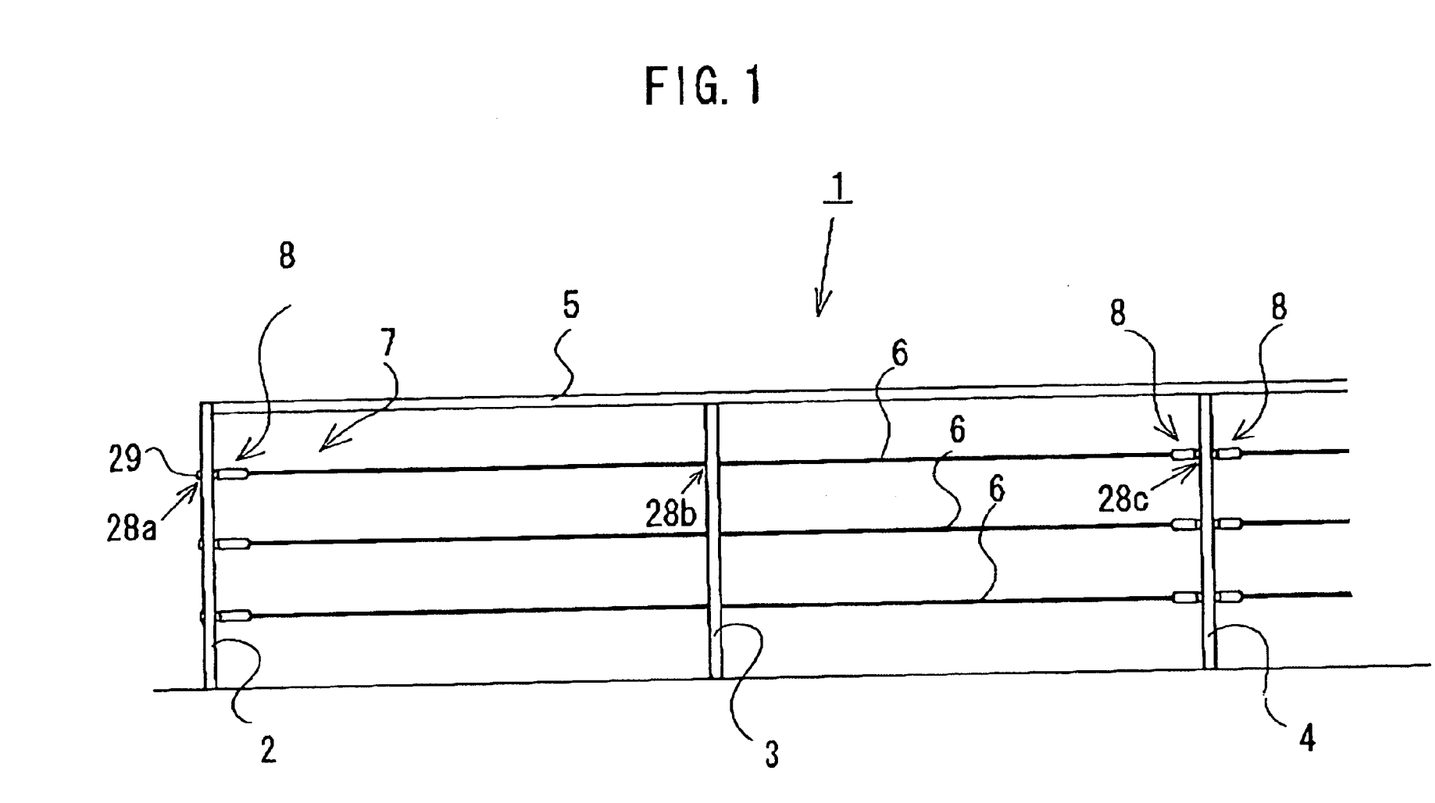
FIG. 1 is an elevation of a handrail according to one embodiment of the present invention.

FIG. 1 shows a horizontal handrail 1 on a flat floor adopting a wire extending structure according to a first embodiment of the present. The handrail 1 has support poles 2, 3, 4, . . . standing on a concrete floor and a handrail bar 5 supported on the tops of the support poles 2, 3, 4, . . . . A wire extending structure 7 using wire fastening devices 8 is installed between the handrail bar 5 and the floor for preventing people from creeping in and dropping from the handrail 1. Each of the support poles 2, 3, 4, . . . constitutes a support body for the wire extending structure 7 and has a simple plate-like shape with a rectangular cross section. The support poles 2, 3, 4, . . . stand parallel with one another with wider sides facing one another and with their lower ends fixed to the floor. Each of the support poles 2, 3, 4, . . . is firmly fixed to the floor and has a rigidity not to incline or bend by tensile forces of the wires 6. If the tensile forces of the wires 6 are set greater, the rigidities of the terminal supporting poles of the handrail are set greater.

The wire extending structure 7 comprises the wire 6 and wire fastening devices 8 for fastening and straining the wire 6 between the support poles 2 and 4.

Figure 2A:
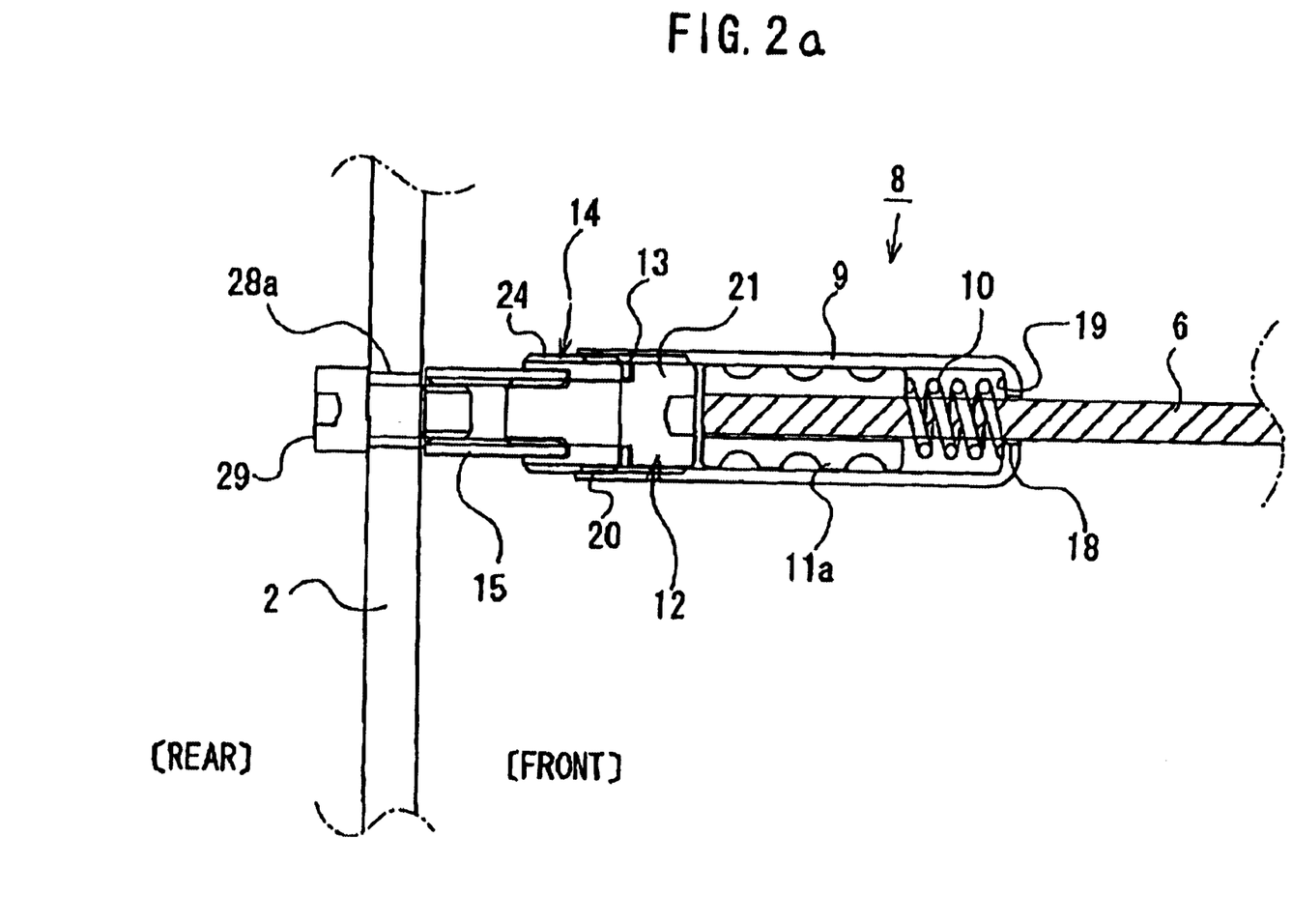
FIG. 2a is a sectional elevation of a terminal pole and a wire fastening device attached to the terminal pole.
Figure 2B:
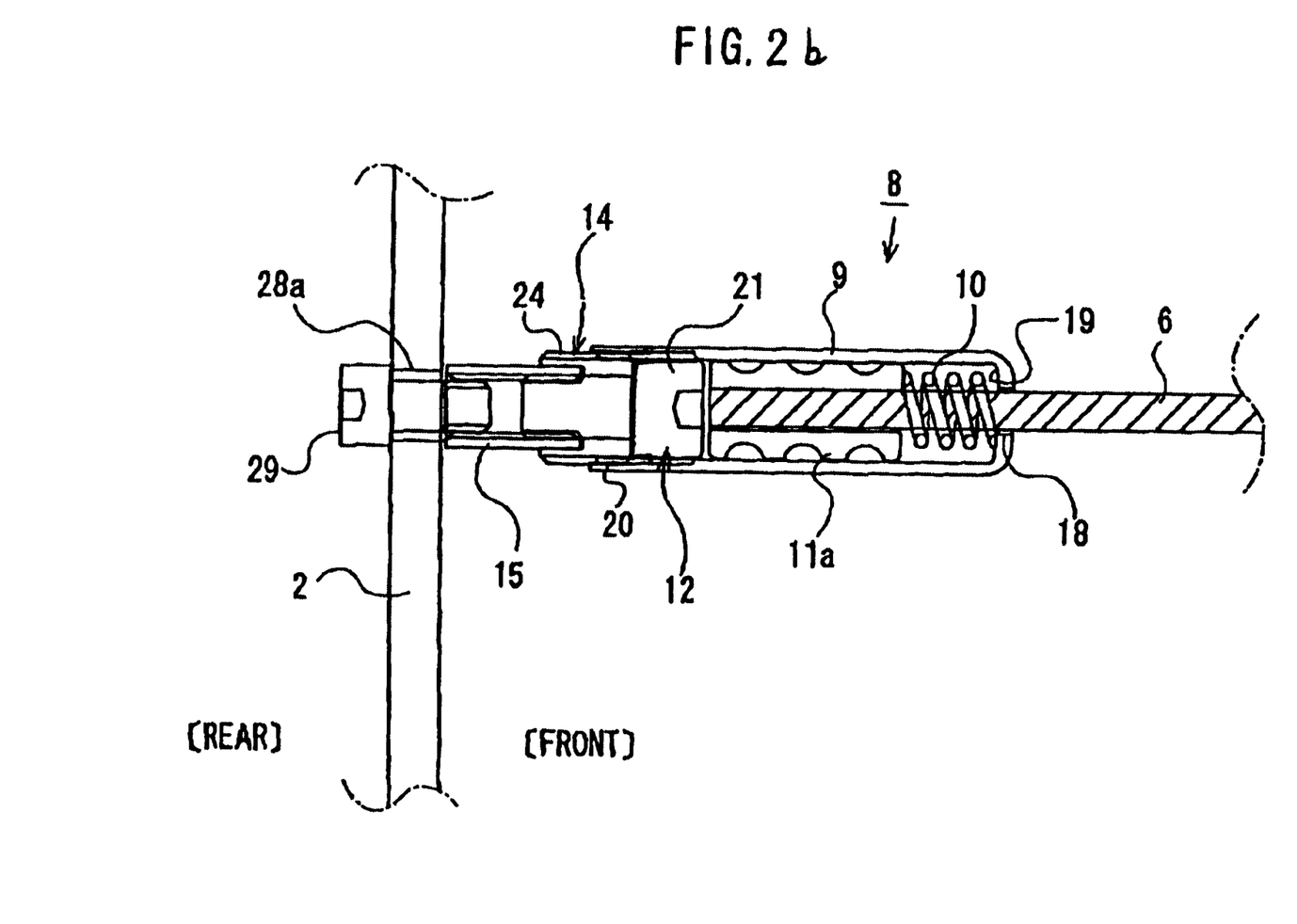
FIG. 2b is a sectional elevation of a terminal pole and a wire fastening device including a modification relative to FIG. 2a attached to the terminal pole.
Figure 3:
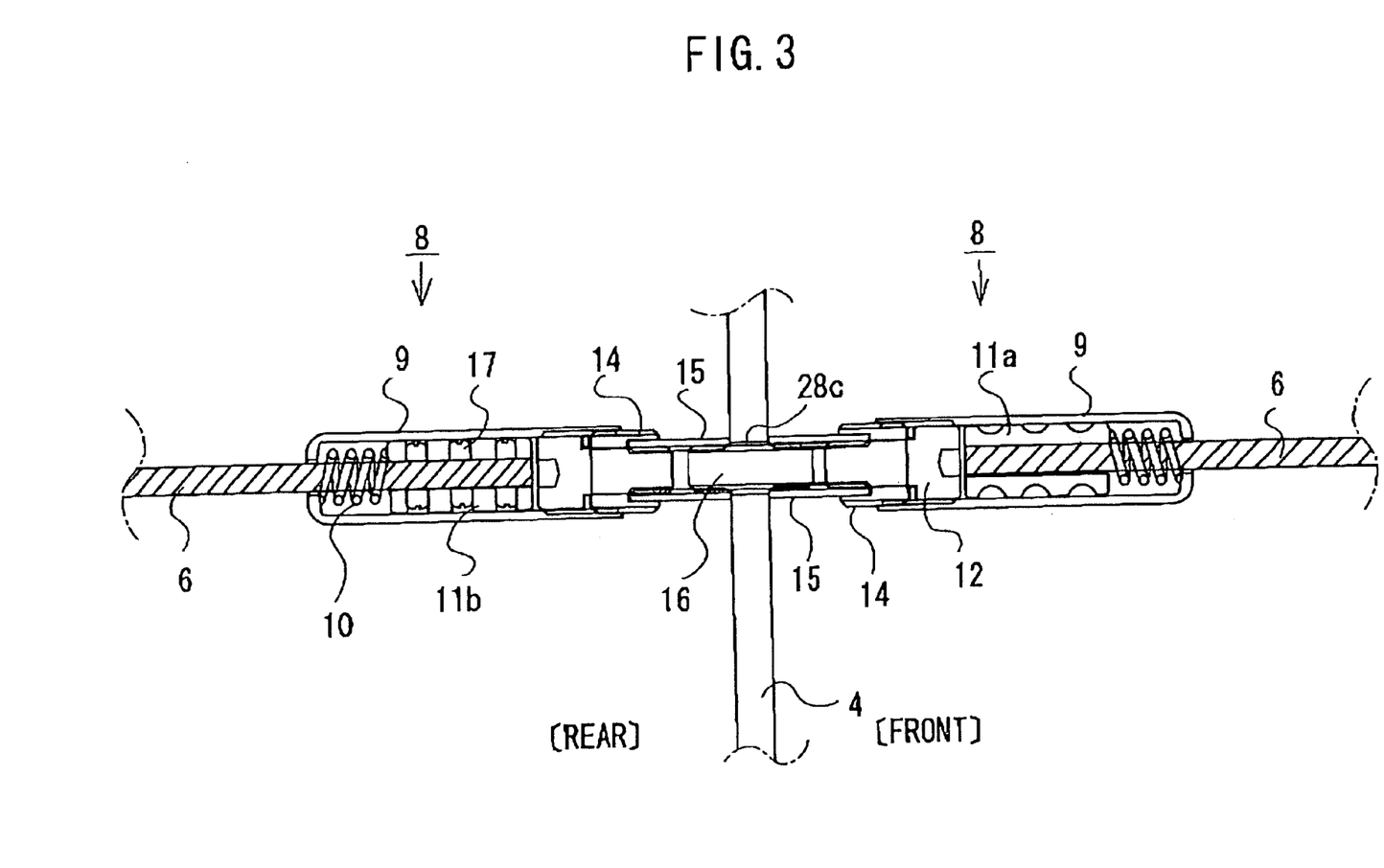
FIG. 3 is a sectional elevation of a connecting pole and the wire fastening devices attached to a connecting pole.
Figure 4:
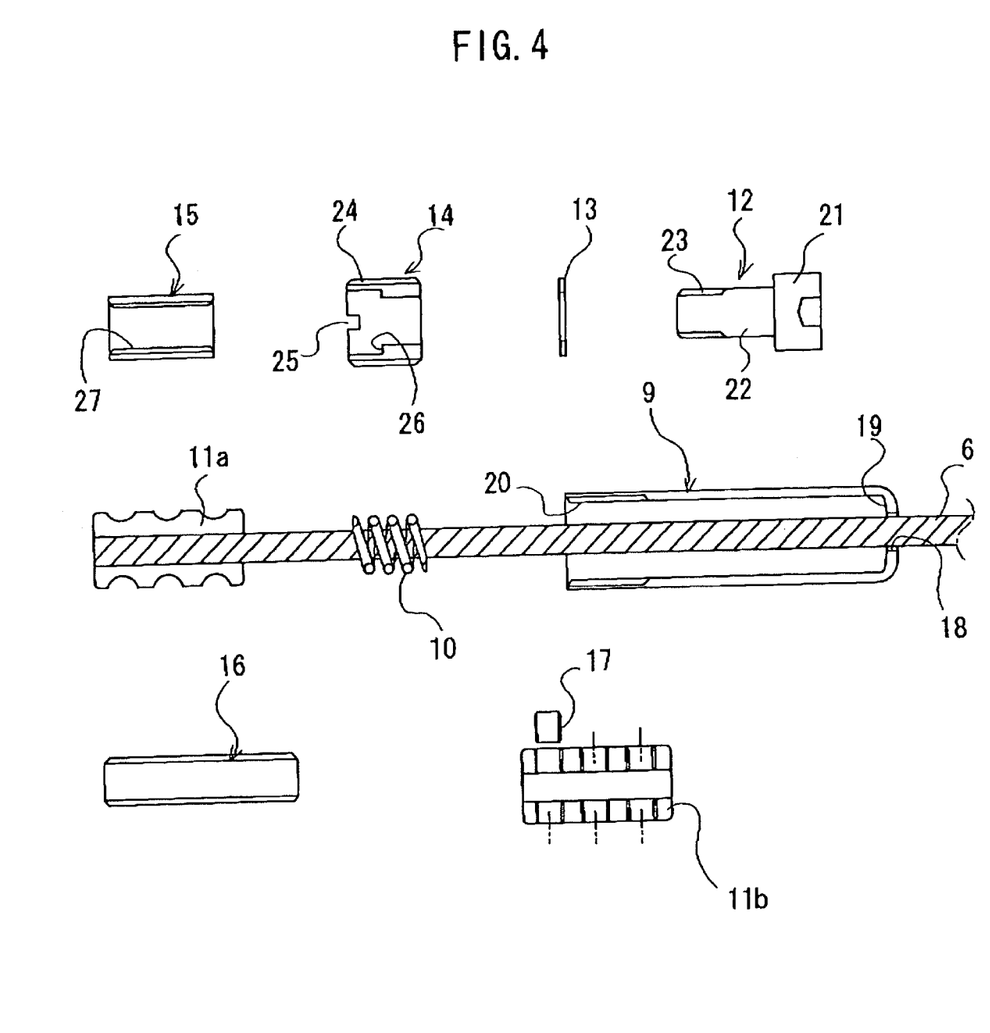
FIG. 4 is an sectional view of elements of the wire fastening device, stoppers, a coil spring, a wire, and a grub screw for interconnecting the wire fastening devices, shown in FIG. 3.

Details of the wire fastening device are shown in FIGS. 2a, 2b and 3. As shown in FIG. 2a, the wire fastening device 8 has a cap bolt 12, a pulling cylinder 14, a washer 13, a spacer 15 and a case 9. The wire 6 is inserted into the case 9 with one end thereof fixed to a stopper 11a by caulking. A coil spring 10 is intervened between the stopper 11a and a rear end of the case 9. The stopper 11a may be caulked on the end of the wire 6 in a factory. As shown in FIG. 3, the other end of the wire 6 is fixed to a wire stopper 11b using set screws 17 when the wire structure 7 is installed.

As shown in FIG. 2a, and as described above, it is not necessary to use the washer 13. Instead, the front end of the pulling cylinder 14 directly abuts the head 21 of the cap bolt 12. Otherwise, all features of FIG. 2b are the same as FIG. 2a.

The case 9 has a cylindrical body and a closed end with a through hole 18 for inserting the wire 6. An engaging portion 19 for engagement with one end of the coil spring 10 is formed at the closed end of the case 9 and a female thread 20 is formed on an inner circumference at an open end of the case 9.

As also shown in FIG. 2a, the cap bolt 12 has a cylindrical head 21 with a hexagon socket and a shank with a male thread 23 on an outer circumference thereof. The washer 13 of a plane type is intervened between the pulling cylinder 14 and the head of the cap bolt 12.

Figure 7:
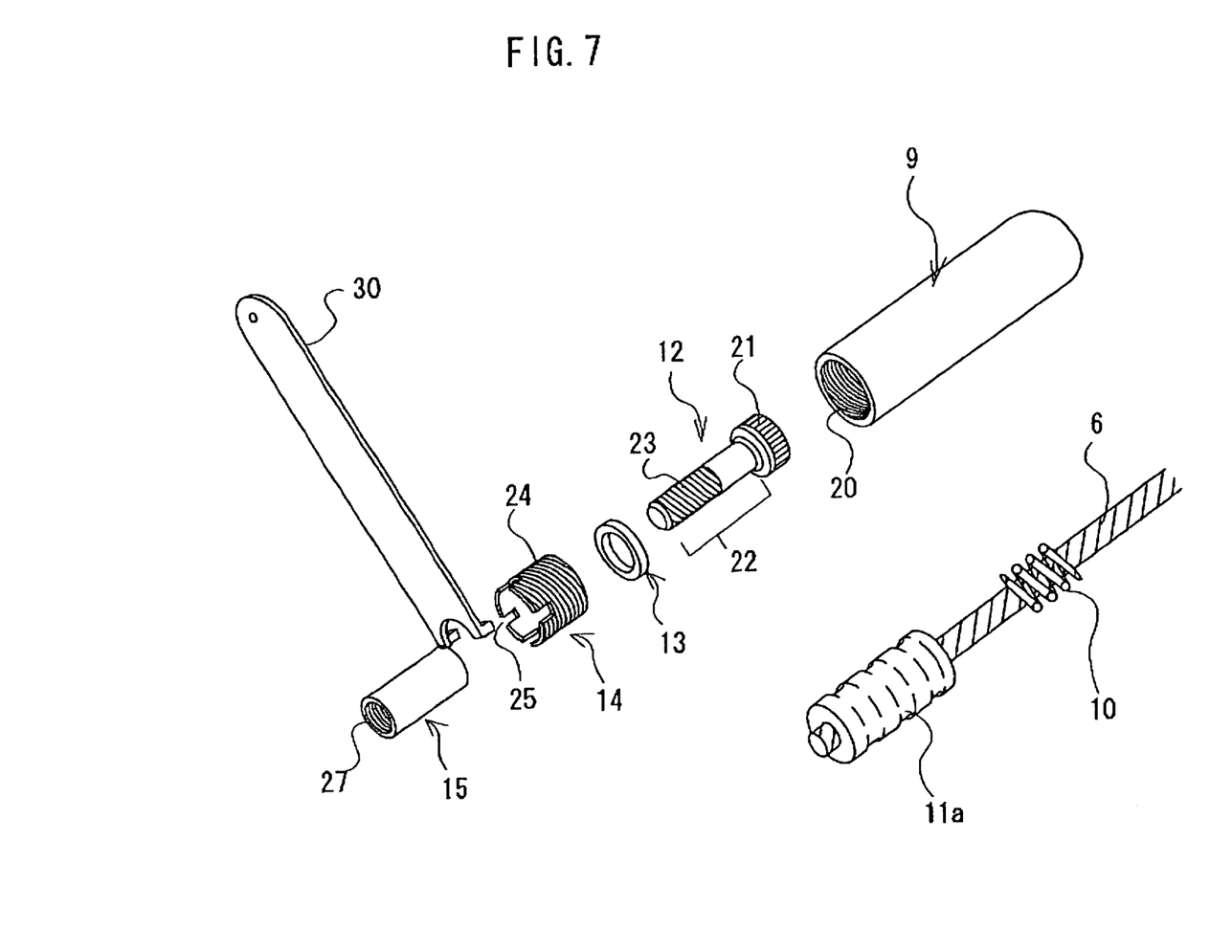
FIG. 7 is an exploded view of the wire fastening device with a dedicated tool.

The pulling cylinder 14 has a male thread 24 on an outer circumference thereof, an inner notch 26 for abutment with the spacer 15 and tool engaging cutaways 25 for engaging with a dedicated tool 30, as shown in FIG. 7 at a rear wire fastening device and a wire extending structure capable of extending a wire with an appropriate tension between support. The wire fastening device includes a case, a cap bolt and a pulling cylinder. The case has a wire engaging portion at one end thereof and a female thread formed on an inner circumference thereof. The cap bolt is inserted into the pulling cylinder with the head abutted with the pulling cylinder and has a male thread formed on an outer circumference thereof. The pulling cylinder is held on the cap bolt rotatably and the case, with one end of the wire engaged therewith, is screwed on the pulling cylinder rear end thereof. The pulling cylinder 14 is fitted into the shank 22 of the cap bolt 12 to abut the head 21 of the cap bolt 12 with the washer 13 therebetween to be rotatable on the shank 22.

The cylindrical spacer 15 has a female thread 27 on an inner circumference thereof.

The female thread 20 of the case 9 and the male thread 24 of the pulling cylinder 14 are left-handed threads with the same pitch, and the male thread 23 of the cap bolt 12 and the female thread 27 of the spacer 15 are right-handed threads with the same pitch.

For constructing the handrail 1, the support poles 2, 3, 4, are set up on the floor with the handrail bar 5 fixed on the support poles 2, 3, 4, . . . , and then the wire extending structure 7 is installed under the handrail bar 5. Each of the support poles 2, 3, 4, . . . has three through holes 28 with an appropriate space therebetween.

The installation of the wire extending structure 7 of FIG. 2a is performed in the following manner. First, the washer 13 and the pulling cylinder 14 are fitted on the shank of the cap bolt 12 and the spacer 15 is screwed on the male thread of the cap bolt 12 to place the pulling cylinder 14 between the spacer 15 and the washer 13. The assembled unit consisting of the cap bolt 12, the washer 13, the pulling cylinder 14 and the spacer 15 forms a connection assembly. The pulling cylinder 14 fitted on the shank of the cap bolt 12 can be rotated at a fixed axial position between the washer 13 and an end face of the spacer 15 screwed on the male thread 23 of the cap bolt 12.

Then, the spacer 15 of the connection assembly is screwed on a threaded portion projecting from the terminal pole 2 of an end bolt 29 inserted into the through hole 28a formed on the terminal pole 2.

As shown in FIG. 3, a grub screw 16 is used for interconnecting the connection assemblies at a connecting pole 4. The grub screw 16 is inserted into the through hole 28c of the connecting pole 4 and the spacers 15 of the connection assemblies are screwed on opposite threaded portions of the grub screw 16, respectively. In this way, the connection assemblies are easily attached to the both sides of the connecting pole 4.

The continuous fence can be formed by attaching the connection assemblies on both sides of another connecting pole using the grub screw 16. A final connection assembly is fixed to the other terminal pole using the end bold 29 inserted in a through hole of the other terminal pole in the same manner as shown in FIGS. 2a, b.

Since a length of one piece of the wire is restricted because of the ability to retain tension and convenience of installation, a long handrail is formed by using the connecting poles 4 between the terminal poles. One or more intermediate poles 3 for additionally supporting the wires 6 are usually provided between the terminal pole 2 and the connecting pole 4 and between the connecting poles 4. In this embodiment, since a durability of the wire connection assembly is high, a distance between the poles can be set long to reduce the number of the connection assemblies and thus lower a cost for installation of the handrail 1.

Then, one end of the wire 6 with the stopper 11a caulked at the other end is inserted into the coil spring 10 and the case 9 from the open end through the through hole 18, and the coil spring 10 and the case 9 are moved to the one end of the wire 6. The female thread 20 of the case 9 is screwed on the male thread 24 of the pulling cylinder 14 of the connecting assembly attached to the terminal pole 2, so that the one end of the wire 6 is connected to the terminal pole 2 provisionally, to the state as shown in FIGS. 2a, b.

The other end of the wire 6 is inserted through the through hole 28b of the intermediate pole 3, and inserted into the through hole 18 of the case 9, the coil spring 10 and the stopper 11b, and the stopper 11b is fixed to the other end of the wire 6 with the set screws 17. Then, the coil spring 10 and the stopper 11b are contained in the case 9 and the case is screwed on the pulling cylinder 14 of the connection assembly attached to the connecting pole 4. Thus, the other end of the wire 6 is provisionally connected to the connecting pole 4.

Figure 5:
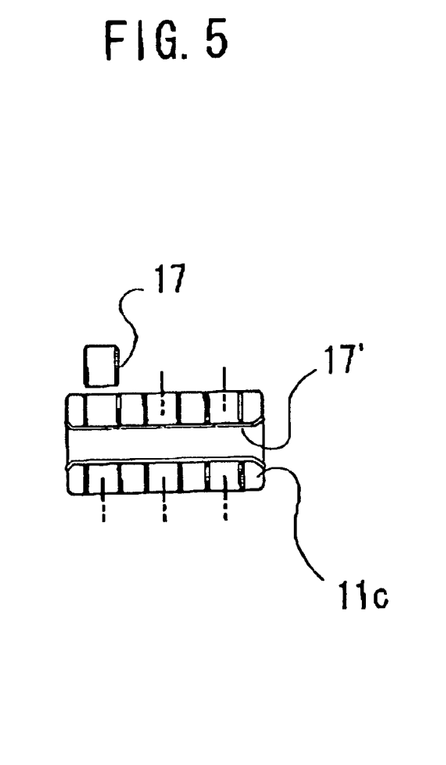
FIG. 5 is a sectional view of another example of a detachable stopper.
Figure 6:
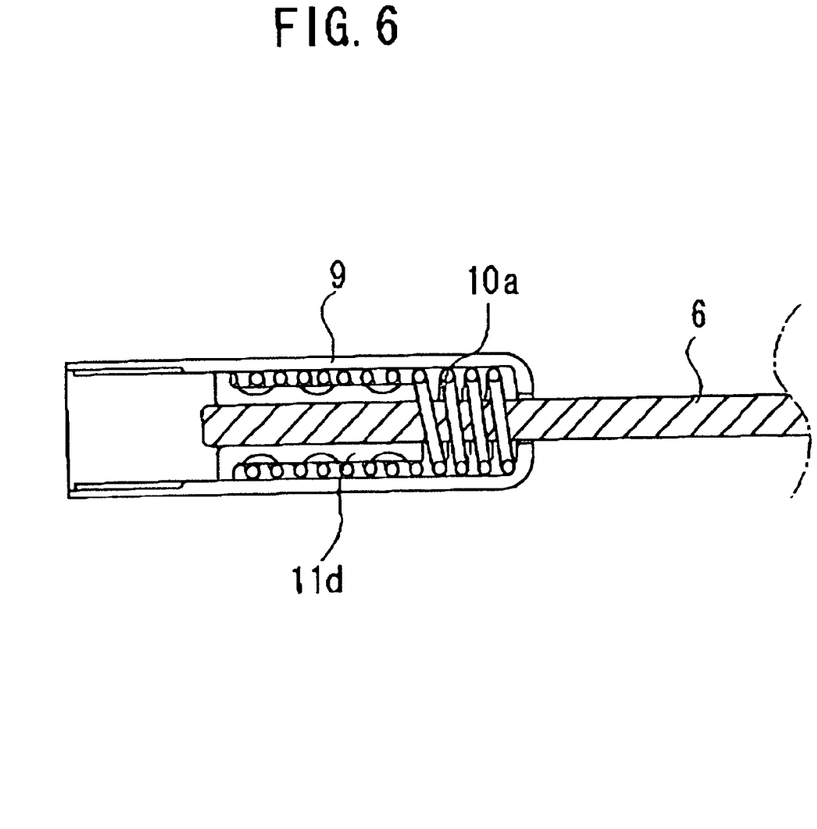
FIG. 6 is a sectional view of another example of a combination of a stopper and a coil spring.

As shown in FIG. 5, a stopper 11c having a thin metal cylindrical tube 17' fitted in the through hole can be used as a substitute for the stopper 11b. The cylindrical tube 17' prevents the other end of the wire 6, which is cut and broken to some extent, from being jammed by female screws for the set screws 17 formed in the stopper 11b and cause pushing forces of the set screws to be applied effectively on the wire 6. Further, as shown in FIG. 6, a thin stopper 11d and a long coil spring 10a fitted around the thin stopper 11d may be used in combination. With this arrangement, a long adjustment range of length of the wire 6 can be obtained by the long coil spring 10a. The stopper 11d is fixed to the one end of the wire 6 by calking and is used as a substitute for the stopper 11a.

Next, in the state as shown in FIGS. 2a, b, the pulling cylinder 14 is rotated with respect to the case 9 held by hand in the left-handed direction using the dedicated tool 30 engaged with the cutaways 25 of the pulling cylinder 14, as shown in FIG. 7. The pulling cylinder 14 rotates at the stationary axial position to make the case 9 move closer to the terminal pole 2. As a result, the one end of the wire 6 engaged with the case through the stopper 11a and the coil spring 10 moves closer to the terminal pole 2 to produce tension on the wire 6 by an elastic force of the coil spring 10. In the same manner, the pulling cylinder 14 of the connecting assembly attached to the connecting pole 4 is rotated with respect to the case 9 engaged with the other end of the wire 6 through the stopper 11b and the coil spring 10. Thus, the wire 6 is extended between the terminal pole 2 and the connecting pole 4 with an appropriate tension.

The pulling cylinder 14 enters into the case 9 with the axial motion of the case 9 and by setting the length of the wire 6 appropriately, the tension of the wire 6 is of an appropriate value when the pulling cylinder 14 is covered by the case 9. In this manner, the pulling cylinder 14 is not exposed to the environment to enhance durability and appearance of the wire fastening device. Further, since the pulling cylinder 14 is covered by the case 9 by rotating the pulling cylinder 14 relatively to the case 9 using the dedicated tool 30, the wire fastening device is prevented from mischiefs of disassemble by rotating the pulling cylinder 14 and the case 9 relatively by hand. If someone rotates the case 9 by hand, the pulling cylinder 14 rotates with the case 9 to maintain the threaded engagement so that case 9 is not moved axially and the wire 6 does not loose the tension.

The wires 6 are connected with each other at the connecting pole 4 by the wire fastening devices 8 with one grub screw 16 intervened therebetween to enhance efficiency.

In this embodiment, tension of the wire 6 can be increased to an extent defined by JIS (Japanese Industrial Standard) when the wire 6 is extended by the wire fastening devices attached to the both ends.

Figure 8:
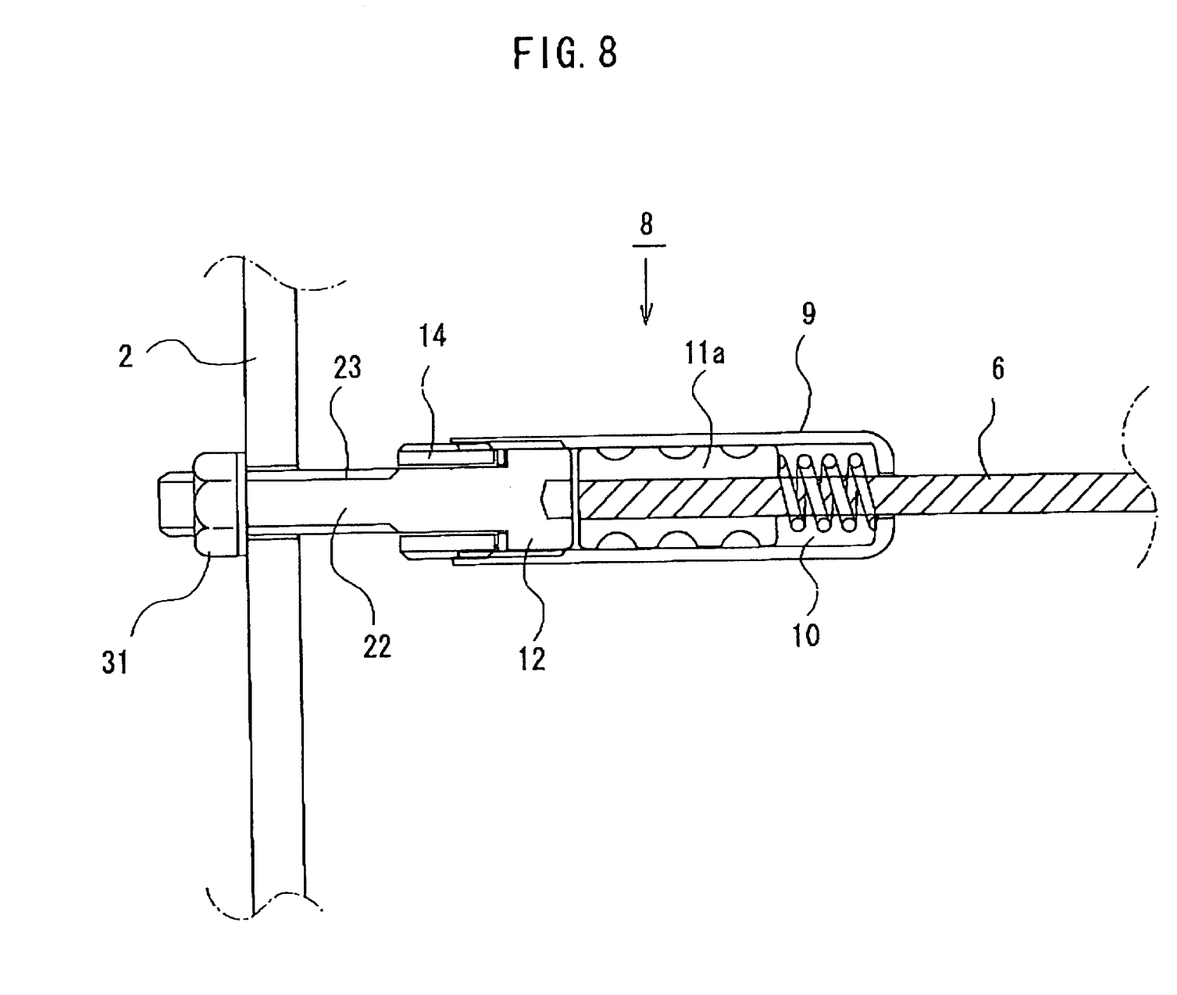
FIG. 8 is a sectional elevation of the terminal pole and a wire fastening device according to another embodiment of the invention.

FIG. 8 shows a second embodiment of the present invention which differs from the connection assembly as shown in FIGS. 2a and b in that the cap bolt 12 having an elongated threaded shank is adopted and the end bolt 29 is replaced with the nut 31. The elongated threaded shank of the cap bolt 12 has a length enough to project from an end face of the terminal pole 2 and the nut 31 is screwed on a projected part of the threaded shank. Since the spacer 15 in the first embodiment is not used, the pulling cylinder 14 can be moved between the inner end face and the head of the cap bolt 12 in the state where the case 9 is not screwed on the pulling cylinder 14. However, when the case 9 is screwed on the pulling cylinder 14 and the wire 6 is pulled by the rotation of the pulling cylinder 14, the pulling cylinder 14 abuts the head of the cap bolt 12 to tighten the wire 6. In this state, the pulling cylinder 14 is rotatable with the cap 9 to have the same advantageous effect as that of the first embodiment. In this embodiment, since the spacer 15 is not used, the fastening device is provided with low cost although the threaded shank of the cap bolt 12 is exposed between the end of the case and the end face of the terminal pole 2.

Figure 9:
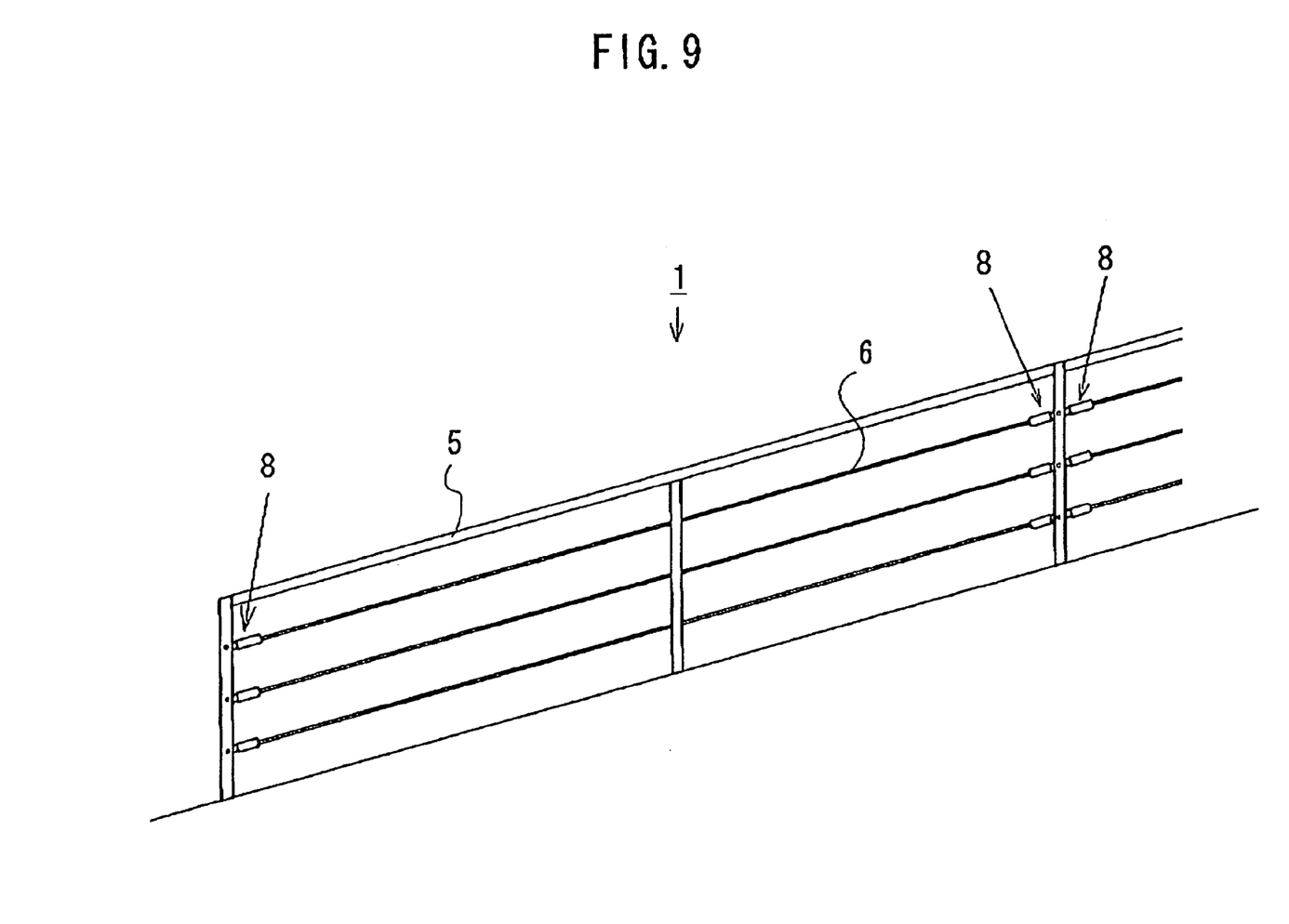
FIG. 9 is an elevation of a handrail using a wire extending structure installed on an inclined floor.
Figure 10:
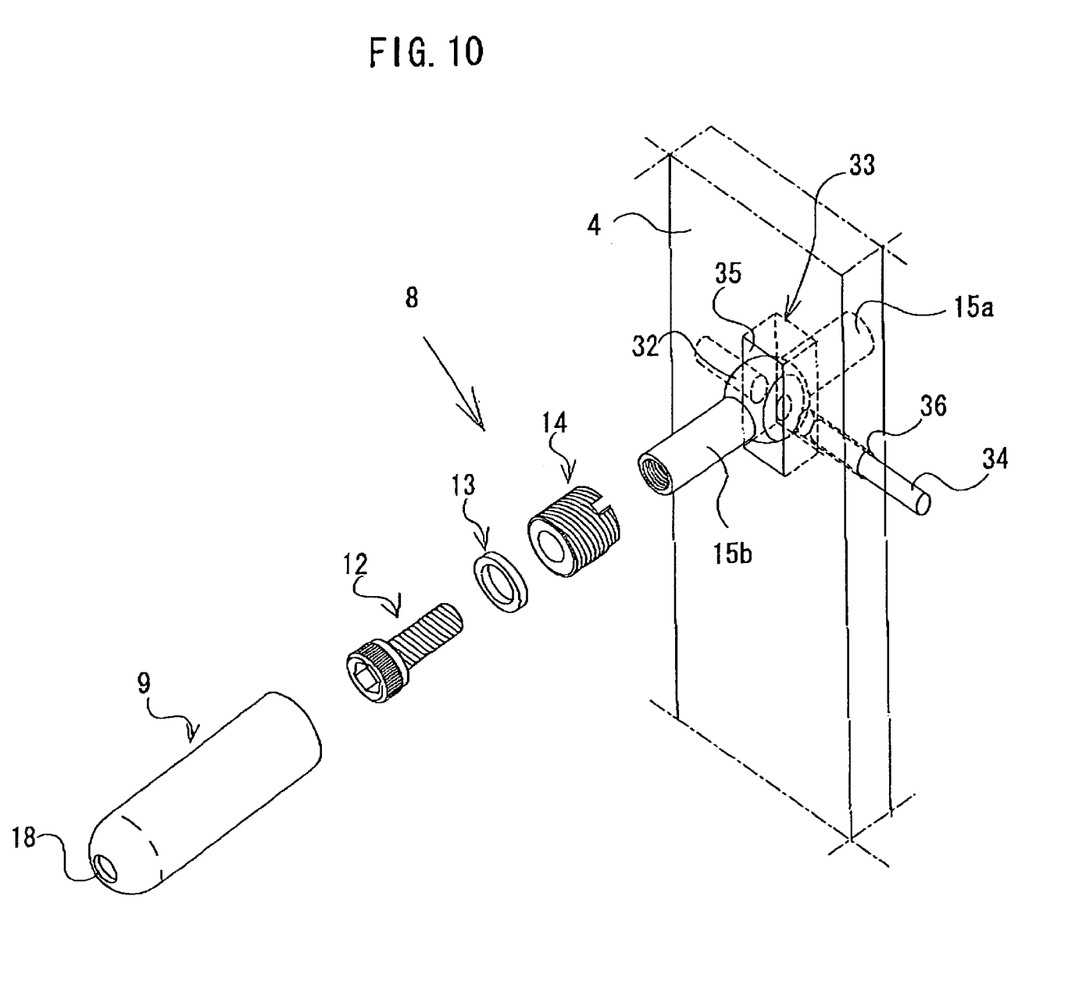
FIG. 10 is a perspective view of a wire fastening device and the connecting pole according to still another embodiment of the present invention.

FIGS. 9 and 10 show a third embodiment of the present invention which relates to an attachment structure of the wire fastening devices to the poles 2 and 4. The wire extending structure of this embodiment is suitable for an inclined floor or ground.

The handrail 1 has vertical poles 2, 3, 4, ... standing on the inclined floor or ground and a handrail bar 5 bridging on tops of the poles 2, 3, 4, .... The wires 6 extend parallel to the floor or ground and diagonally to the poles 2, 3, 4, ... between the handrail bar 5 and the floor or ground with appropriate spaces using the fastening devices 8.

The wire extending structure of this embodiment comprises the case 9, the coil spring 10, the cap bolt 12, the washer 13, the stopper 11a, the pulling cylinder 14 as in the first embodiment, but differs from the first embodiment in that the connection member 33 is used in place of the spacer 15 and the grub screw 16. The connection member 33 has spacers 15a and 15b aligned on a line and a boss 32 interconnecting the spacers 15a and 15b and supported by a shaft 34 to be rotatable about an axis perpendicular to the axis of the wire 6.

A through hole 35 extending in the transverse direction of the pole 4 and having a vertical size slightly larger than a diameter of the boss 32 is formed in the pole 4. A through hole 36 for inserting the shaft 34 is formed in the direction perpendicular to the transverse direction of the pole 4.

The connection member 33 is inserted into the through hole 35 of the pole 4 and the shaft 34 is inserted into the through hole 36 from behind to support the connection member 33 to be swingable about the shaft 34.

The cap bold 12 is inserted into the washer 13 and the pulling cylinder 14, and screwed in the spacer 15b. Then the cap 9 with the stopper 11b, the coil spring 10 and the wire 6 is screwed on the pulling cylinder 14 by rotating the pulling cylinder 14 by the dedicated tool 30 in the same manner as in the first embodiment.

At the terminal pole 2, the wire 6 is connected to the terminal pole 2 using the connection member 33 and the wire fastening device 8. Since the spacer 15b of the connection member 33 is not necessary at the terminal portion of the wire extending structure, the spacer 15b is cut away or a connection member without the spacer 15b is used.

Figure 11A:
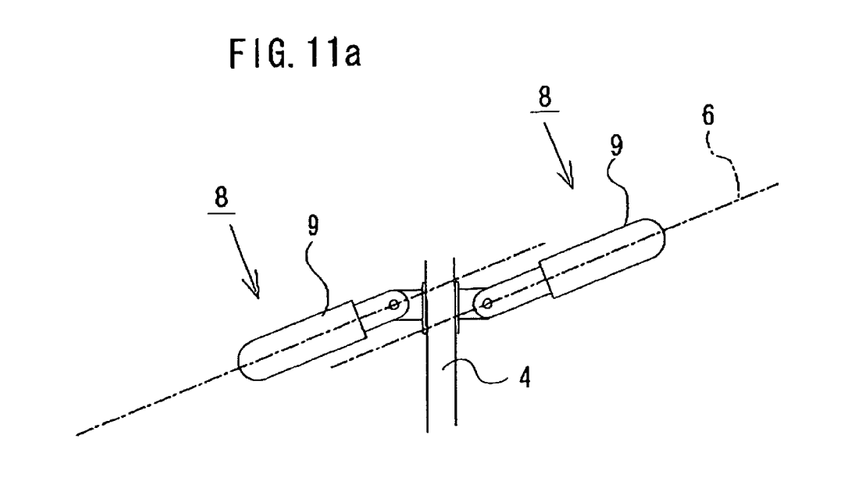
FIG. 11a is an elevation of a connection part of the wires with a stationary connector.
Figure 11B:
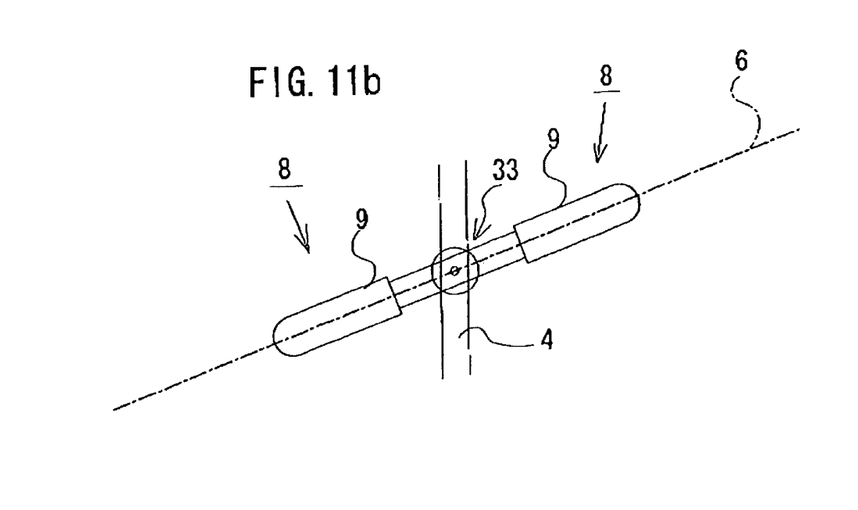
FIG. 11b is an elevation of a connection part of the wires with the swingable connector as shown in FIG. 10.

In this embodiment, since the wire fastening devices 8 are attached to the pole to be swingable about the shaft 34 to allow the axis of the wire 6 to incline as shown in FIG. 11b, the axes of the wires 6 on both sides of the connecting pole 4 coincide with each other to enhance the strength and appearance of the wire extending structure as compared with a stable bracket as shown in FIG. 11a.

A unit of the wire extending structure between the terminal pole 2 and the connecting pole 4 is described above, and the unit can be repeated any desired times to form the wire extending structure of a desired length to terminate at the other terminal pole 2. Further, the unit of the wire extending structure is repeated to form a circle around a pond, lake, etc. In this case, the wire extending structure may be constituted using the connecting poles only and the terminal poles with the end bolts 29 are not necessary.

According to the present invention, since the pulling cylinder is fully inserted into and covered by the case, and rotates with the case when the case is rotated by hand, mischiefs to loosen the wire are prevented.

Further, since the wire fastening devices of the same structure can be used for connection with support bodies, the number of the elements of the wire fastening device is reduced. After provisionally attaching both ends of the wire to the opposite support bodies, an appropriate tension is applied to the wire by rotating the cases of the fastening devices to enable the installation of the wire extending structure to be performed easily by one person. The resilient member between the stopper and the case retains the appropriate tension on the wire and also enables one to pull the wire to adjust the length of the wire and the distance between the support bodies.

What is claimed is:

1. A wire fastening device comprising:
   a cap bolt having a head and a shank;
   a pulling cylinder contacting the shank of said cap bolt, wherein a first end of the pulling cylinder is rotatably connected relative to the head of said cap bolt, said pulling cylinder having a male thread on an outer circumference thereof and an inner diameter greater than a diameter of the shank of said cap bolt and smaller than a diameter of the head of said cap bolt; and
   a case having an inner diameter not less than an outer diameter of the pulling cylinder, a wire engaging portion at a first end thereof and a female thread formed on an inner circumference of a second, open end thereof to receive at least a portion of said pulling cylinder and said head therein by threaded engagement of said male thread and said female thread with said head of said cap bolt being located within the case between said first end of the case and said pulling cylinder.

2. A wire fastening device according to claim 1, further comprising a washer between the head of said cap bolt and the first end of said pulling cylinder.

3. A wire fastening device according to claim 1, wherein the male thread of said pulling cylinder and the female thread of said case are of left-handed threads.

4. A wire fastening device according to claim 1, wherein said pulling cylinder has notches on a second, opposite end thereof for engagement with a dedicated tool.

5. A wire fastening device according to claim 1, further comprising a cylindrical spacer having a female thread on an inner circumference thereof, to be screwed on the male thread of the shank of said cap bolt so that said pulling cylinder is held rotatable between the head of said cap bolt and the spacer.

6. A wire fastening device according to claim 5, wherein said spacer is supported swingably by a boss formed integrally therewith.

7. A wire fastening device according to claim 5, wherein an end of said spacer abuts with said pulling cylinder so that said pulling cylinder is held rotatable at a stationary position in an axial direction of said cap bolt.

8. A wire extending structure comprising:
   at least two support bodies;
   wire fastening devices, each including: a cap bolt having a head and a shank; a pulling cylinder contacting the shank of said cap bolt wherein a first end of the pulling cylinder is rotatably connected relative to the head of said cap bolt, said pulling cylinder having a male thread on an outer circumference thereof and an inner diameter greater than a diameter of the shank of said cap bolt and smaller than a diameter of the head of said cap bolt; and
   a case having an inner diameter not less than an outer diameter of the pulling cylinder, a wire engaging portion at a first end thereof and a female thread formed on an inner circumference of a second, open end thereof to receive at least a portion of said pulling cylinder and said head therein by threaded engagement of said male thread and said female thread with said head of said cap bolt being located within the case between said first end of the case and said pulling cylinder,
   wherein the shank of the cap bolt of one of the wire fastening devices is fixed to one of the support bodies and the shank of the cap bolt of another of the wire fastening devices is fixed to another of the support bodies; and
   a wire with one end and another end thereof fixed to stoppers engaged with the wire engaging portions of the cases of said one and another of the wire fastening devices, respectively.

9. A wire extending structure according to claim 8, wherein said another of the wire fastening devices is connected with still another of the wire fastening devices arranged on an opposite side of said another support body by a grub screw to continue the wire extending structure.

10. A wire extending structure according to claim 8, further comprising a resilient member between the case and one of the stoppers that is fixed to the wire.

11. A wire extending structure comprising:
    at least two support bodies;
    wire fastening devices, each including:
       a cap bolt having a head and a shank;
       a pulling cylinder having on an outer circumference thereof a male thread and contacting the shank of said cap bolt so as to be rotatably connected to said cap bolt;
       a case having a wire engaging portion at one end thereof and a female thread formed on an inner circumference thereof, and connected to said pulling cylinder by threaded engagement of said male thread and said female thread, the shank of the cap bolt of one of the wire fastening devices being fixed to one of the support bodies and the shank of the cap bolt of another of the wire fastening devices being fixed to another of the support bodies; and
    a wire with one end and another end thereof fixed to stoppers engaged with the wire engaging portions of the cases of said one and another of the wire fastening devices, respectively,
    wherein said another of the wire fastening devices is connected with still another of the wire fastening devices arranged on an opposite side of said another support body by a grub screw to continue the wire extending structure.

12. A wire fastening device comprising:
    a cap bolt having a head and a shank;
    a pulling cylinder fitted on the shank of said cap bolt having one end of said pulling cylinder abutted with the head of said cap bolt so as to be rotatably supported by said cap bolt, said pulling cylinder having a male thread on an outer circumference thereof and an inner diameter thereof greater than a diameter of the shank of said cap bolt and smaller than a diameter of the head of said cap bolt and a case having a wire engaging portion at one end thereof and a female thread formed on an inner circumference thereof to be connected to said pulling cylinder by threaded engagement of said male thread and said female thread, wherein said pulling cylinder has notches on the other end thereof for engagement with a dedicated tool.

13. A wire extending structure comprising:

at least two support bodies;

wire fastening devices, each including: a cap bolt having a head and a shank; a pulling cylinder fitted on the shank of said cap bolt, having one end abutted with the head of said cap bolt so as to be rotatably supported by said cap bolt, having a male thread on an outer circumference thereof, and an inner diameter thereof greater than a diameter of the shank of said cap bolt and smaller than a diameter of the head of said cap bolt;

a case having a wire engaging portion at one end thereof and a female thread formed on an inner circumference thereof, and connected to said pulling cylinder by threaded engagement of said male thread and said female thread, the shank of the cap bolt of one of the wire fastening devices being fixed to one of the support bodies and the shank of the cap bolt of another of the wire fastening devices being fixed to another of the support bodies; and a wire with one end and another end thereof fixed to stoppers engaged with the wire engaging portions of the cases of said one and another of the wire fastening devices, respectively, wherein said another of the wire fastening devices is connected with still another of the wire fastening devices arranged on an opposite side of said another support body by a grub screw to continue the wire extending structure.

14. A wire extending structure comprising:

at least two support bodies;

wire fastening devices, each including:
  a cap bolt having a head and a shank;
  a pulling cylinder having on an outer circumference thereof a male thread, being fitted on the shank of said cap bolt, having one end abutted with the head of said cap bolt so as to be rotatably supported to said cap bolt;
  a case having a wire engaging portion at one end thereof and a female thread formed on an inner circumference thereof, and connected to said pulling cylinder by threaded engagement of said male thread and said female thread, the shank of the cap bolt of one of the wire fastening devices being fixed to one of the support bodies and the shank of the cap bolt of another of the wire fastening devices being fixed to another of the support bodies; and
  a wire with one end and another end thereof fixed to stoppers engaged with the wire engaging portions of the cases of said one and another of the wire fastening devices, respectively, wherein said another of the wire fastening devices is connected with still another of the wire fastening devices arranged on an opposite side of said another support body by a grub screw to continue the wire extending structure.

* * * * *